(12) United States Patent
Donk et al.

(10) Patent No.: US 7,405,651 B2
(45) Date of Patent: Jul. 29, 2008

(54) OPERATING ELEMENT FOR A HEATING AND AIR CONDITIONING SYSTEM

(75) Inventors: Vera Donk, Babenhausen (DE); Guido Meier-Arendt, Langen (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 11/224,325

(22) Filed: Sep. 13, 2005

(65) Prior Publication Data

US 2006/0114106 A1    Jun. 1, 2006

(30) Foreign Application Priority Data

Sep. 14, 2004    (DE) .................. 10 2004 044 880

(51) Int. Cl.
*B60Q 1/00* (2006.01)
(52) U.S. Cl. .................. 340/449; 340/825.19; 434/112; 434/113; 434/114
(58) Field of Classification Search ................ 340/438, 340/449, 825.19, 407.1; 701/36; 345/173; 434/112–114
See application file for complete search history.

(56) References Cited

U.S. PATENT DOCUMENTS 6,639,510 B1    10/2003    Soulie 6,937,225 B1 *  8/2005    Kehlstadt et al. ............ 345/156
7,084,859 B1 *  8/2006    Pryor ......................... 345/173

FOREIGN PATENT DOCUMENTS

| DE | 102 34 863 A1 | 2/2004 |
|---|---|---|
| DE | 102 54 150 A1 | 6/2004 |
| DE | 103 15 841 A1 | 8/2004 |
| EP | 1 166 252 B1 | 1/2002 |
| JP | 59-008520 | 1/1984 |
| JP | 2001-001744 | 1/2001 |
| WO | WO 00/33167 | 6/2000 |

OTHER PUBLICATIONS

Chinese Office Action dated Jun. 1, 2007, directed to counterpart CN application No. 2005/10102856.

* cited by examiner

*Primary Examiner*—George A Bugg
*Assistant Examiner*—Samuel J Walk
(74) *Attorney, Agent, or Firm*—Laurence A. Greenberg; Werner H. Stemer; Ralph E. Locher

(57) ABSTRACT

The invention relates to an operating element for a heating and air conditioning system for the setting of air conditioning parameters in a vehicle interior, the setting being fed back to the operator of the operating element. In order to provide an operating element for a heating and air conditioning system, for the operating of which the attention of the vehicle driver is demanded as little as possible, the feedback of the set air conditioning parameters to the operator takes place by means of the operating element itself.

8 Claims, 2 Drawing Sheets

OPERATING ELEMENT FOR A HEATING AND AIR CONDITIONING SYSTEM

Figure 1:
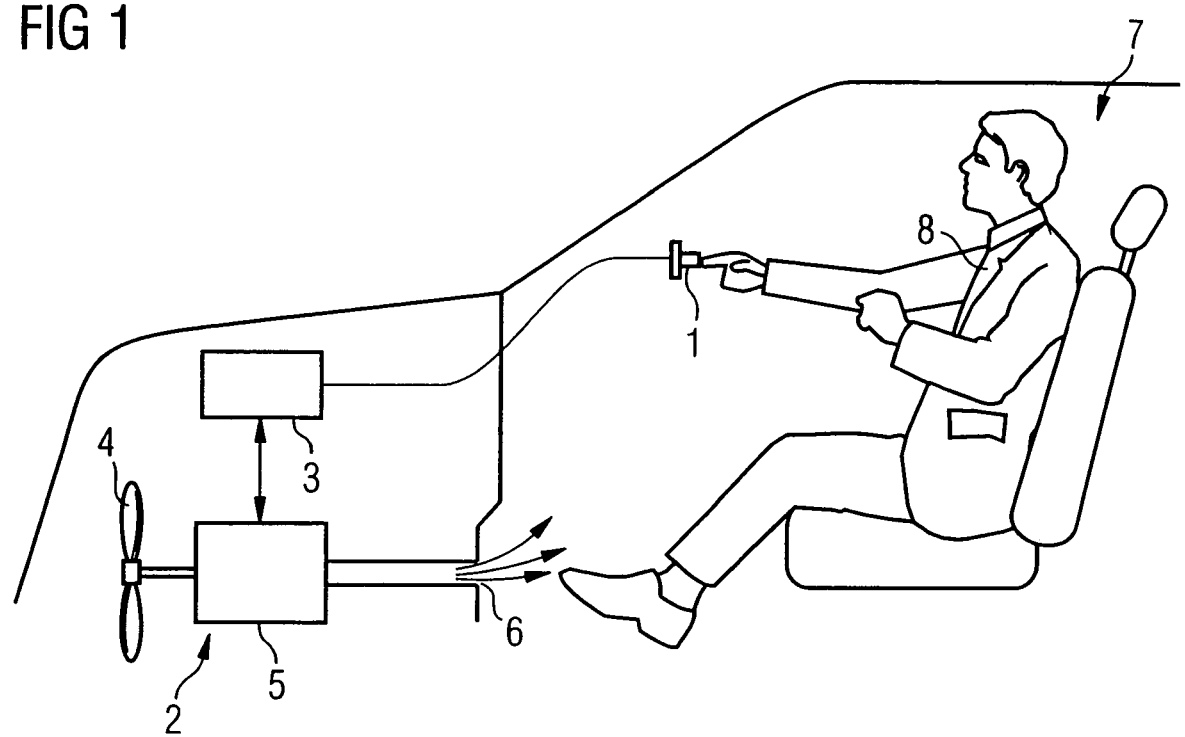

The invention relates to an operating element for a heating and air conditioning system for setting air conditioning parameters in a vehicle interior, the setting being fed back to the operator of the operating element.

Modern motor vehicles, as a rule, are equipped with a combined heating and air conditioning system. Depending on requirements, the interior of the motor vehicle can therefore be heated or cooled. To operate these heating and air conditioning systems, a series of operating elements are known, which, as a rule, are arranged in the middle console or in the instrument panel. The parameters selected by the operator of the heating and air conditioning system are mostly indicated visually in a display which is itself arranged at another location in the middle console or in the instrument panel. For a selected temperature, for example, a numerical value, which indicates the desired temperature in degrees Celsius, appears in the display. So that this value can be read off, the vehicle occupant operating the heating and air conditioning system, as a rule, has to take his eyes off the road and the traffic situation and look at the display in order to be able to read off and set the desired temperature. The attention of the vehicle driver is consequently diverted from the traffic situation, this having an adverse effect on traffic safety.

The object of the present invention is, therefore, to provide an operating element for a heating and air conditioning system, for the operation of which the attention of the vehicle driver is demanded to the least possible extent.

The object is achieved, according to the invention, in that the feedback of the set air conditioning parameters to the operator takes place by means of the operating element itself. The advantage of this is that the operating action demands the attention of the operator of the heating and air conditioning system, when the latter is being set, to only a very slight extent. When the heating and air conditioning system is operated by the vehicle driver, he can devote his attention to a high degree to the traffic situation.

In a development of the invention, the feedback is detectable by touching the operating element. The operator therefore does not need to make any visual contact with the operating element in order to obtain information on its setting carried out on the operating element. As the vehicle driver, the operator of the operating element can direct his visual perception fully to the traffic situation.

In one embodiment, the feedback when the operating element is touched is detectable in the form of a temperature change of the operating element. If, for example, the operator desires a higher temperature in the vehicle interior and sets this by means of the operating element, the temperature at the operating element changes to a higher temperature, which the operator feels and from which he infers intuitively that his wish for a higher temperature in the vehicle interior has been recognized by the system. Such an intuitive operating concept can be learnt very easily, thus markedly enhancing the operating comfort of this system. Similar advantages arise from a further embodiment, in which the feedback caused by touching the operating element is detectable in the form of a temperature of the operating element which deviates from the vehicle interior temperature.

In a next embodiment, the feedback is detectable by means of a visual feedback of the operating element. As a result of visual feedback directly by the operating element, the location of the control signal input and the location of the system feedback are combined, thus making it unnecessary for the operator to seek the location of the system feedback. This, too, increases safety when a vehicle motor is being driven. The advantages mentioned here are also achieved by means of the embodiment where the feedback is detectable by means of a visual feedback in the form of a change in the illumination color of the operating element.

In accordance with the ergonomic requirements of the operating element, the operating element may advantageously be designed as a rotary actuator, a key button or a slide regulator.

Figure 2A:
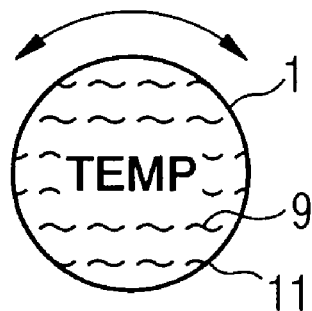
Figure 2B:
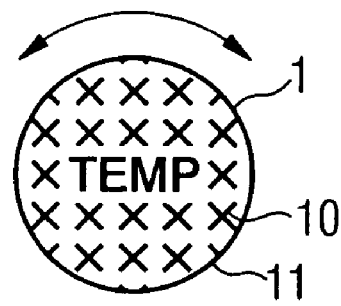
Figure 3A:
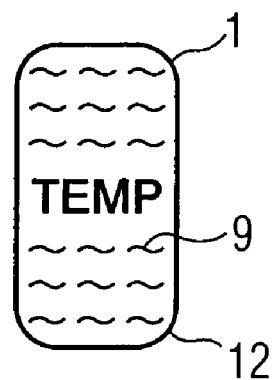
Figure 3B:
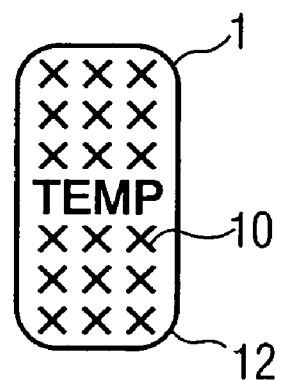
Figure 4:
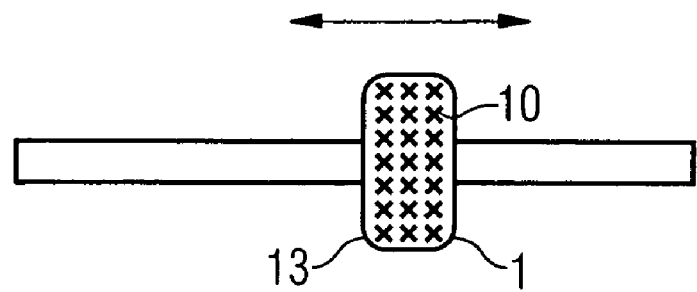

The invention permits numerous embodiments. To make the basic principle even clearer, some of these are described by way of example, in the figures in which:

FIG. 1 shows a motor vehicle with a vehicle interior,

FIG. 2a shows the operating element as a rotary actuator, in a situation in which a temperature lower than the air temperature in the vehicle interior is desired, FIG. 2b shows the operating element as a rotary actuator, in a situation in which a temperature which is higher than the air temperature in the vehicle interior is desired, FIG. 3a shows the operating element as a key button, in a situation in which a temperature which is lower than the air temperature in the vehicle interior is desired, FIG. 3b shows the operating element as a key button, in a situation in which a temperature which is higher than the air temperature in the vehicle interior is desired, FIG. 4 shows the operating element as a slide regulator.

FIG. 1 shows a motor vehicle with a vehicle interior 7. In the vehicle interior 7, there is a vehicle occupant 8 who is at the same time the operator 8 of the operating element 1. By means of the operating element 1, a heating and air conditioning system 2 is operated. The operating element 1 serves for setting the desired temperature in the vehicle interior 7. The heating and air conditioning system 2 consists, here, of a fan 4, of a control apparatus 3, of a heat exchanger 5 and of air outlet nozzles 6. This figure illustrates only the components of an air conditioning and heating system 2 which are important for understanding the present invention. By means of the operating element 1, the vehicle occupant 8 regulates a desired temperature, this being recognized by the control apparatus 3 which activates the heat exchanger in such a way that a correspondingly warmed or cooled air emerges from the air outlet nozzles 6.

The operating element 1 itself is described in more detail in FIGS. 2, 3 and 4.

In FIGS. 2a and b, the operating element 1 is designed as a rotary actuator 11. The desired temperature is set by means of the operating element 1.

FIG. 2a shows the situation in which a temperature which is lower than the air temperature in the vehicle interior 7 is desired. When this temperature is set as a result of the rotation of the operating element 1, the operating element 1 gives a first feedback 9 to the operator 8. This first feedback 9 may, for example, be that the operating element 1, when its surface is touched, seems to be cold to the operator 8 and/or its characteristic illumination changes toward the color "blue". The operating element 1 itself consequently feeds the temperature change desired by the vehicle occupant 8 back to the operator 8. This feedback is illustrated by the wavy hatching on the operating element 1.

FIG. 2b illustrates the situation in which the operator 8 of the operating element 1 wishes to increase the temperature in the vehicle interior 7. For this purpose, he rotates the operating element 1 in the corresponding direction, and the operating element 1 signals to the operator 8 that the temperature is changed to higher values in that the operating element itself becomes warm and/or, for example, its color changes toward "red". This feedback is illustrated by the crossed hatching on the operating element 1.

In FIGS. 3a and b, the operating element 1 is designed as a rocker key button 12. Here, too, the operator 8 can, via the operating element 1, enter his individual wish for the temperature in the vehicle interior 7.

FIG. 3a illustrates the situation where the operator 8 wishes to reduce the vehicle interior temperature. For this purpose, the key button 12 is operated correspondingly, and the operating element 1 transmits a first feedback 9 to the operator 8, in that, for example, it itself becomes cold and/or its color changes toward the blue spectrum. This feedback is illustrated by the wavy hatching on the operating element 1.

FIG. 3b, in turn, illustrates the wish of the operator 8 to increase the interior temperature of the motor vehicle. After the operator 8 has operated the operating element 1 correspondingly, the operating element 1 generates a second feedback 10, in that, for example, it feels warm and/or its characteristic illumination shifts toward the red spectrum. This feedback is illustrated by the crossed hatching on the operating element 1.

Owing to the possibility of feeling the set values in the form of a warm or cold feedback from the operating element 1 to the vehicle occupant 8, the setting of the heating and air conditioning system 2 takes place via sensation channels which are not required directly for the safe forward movement of the motor vehicle. As a result, the concentration of the vehicle driver 8 is demanded to a substantially lesser extent than in the conventional form of acquisition of set values by a display. The color change in the operating element 1 also demands the concentration and attention of the vehicle driver 8 to a substantially lesser extent, since the desired values and the corresponding feedback are entered at one and the same location, this being recorded intuitively by the operator 8 substantially more quickly than a feedback according to the prior art.

The operating element 1 is designed as a slide regulator 13 in FIG. 4.

The invention claimed is:

1. An operating element for a heating and air conditioning system for setting air conditioning parameters in a vehicle interior, the operating element comprising:
   a selection element for setting the air conditioning parameters in the vehicle interior;
   said selection element including a surface heated or cooled to a temperature providing an indication of a temperature setting selected by said selection element.

2. The operating element according to claim 1, wherein: the temperature providing the indication of the temperature setting is detectable by touching said selection element.

3. The operating element according to claim 1, wherein: the temperature providing the indication of the temperature setting deviates from a temperature of the vehicle interior.

4. The operating element according to claim 1, wherein: said selection element also provides a visual signal indicating the temperature setting.

5. The operating element according to claim 4, wherein: said selection element is illuminated with light having a color providing the visual signal.

6. The operating element according to claim 1, wherein: said selection element is a rotary actuator.

7. The operating element according to claim 1, wherein: said selection element is a key button.

8. The operating element according to claim 1, wherein: said selection element is a slide regulator.

* * * * *